(12) United States Patent
Jha et al.

(10) Patent No.: US 11,106,505 B2
(45) Date of Patent: Aug. 31, 2021

(54) SYSTEM AND METHOD FOR MANAGING WORKLOADS USING SUPERIMPOSITION OF RESOURCE UTILIZATION METRICS

(71) Applicant: VMWARE, INC., Palo Alto, CA (US)

(72) Inventors: Ritesh Jha, Bangalore (IN); Jobin George, Bangalore (IN); Shivanju Awasthi, Bangalore (IN); Chandrashekhar Jha, Bangalore (IN); Nikhil Jaiswal, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 119 days.

(21) Appl. No.: 16/424,517

(22) Filed: May 29, 2019

(65) Prior Publication Data

US 2020/0326982 A1    Oct. 15, 2020

(30) Foreign Application Priority Data

Apr. 9, 2019  (IN) .............................. 201941014309

(51) Int. Cl.
*G06F 9/50* (2006.01)
*G06F 9/48* (2006.01)
*G06F 9/455* (2018.01)

(52) U.S. Cl.
CPC ............ *G06F 9/505* (2013.01); *G06F 9/4856* (2013.01); *G06F 9/5077* (2013.01); *G06F 9/45541* (2013.01)

(58) Field of Classification Search
CPC ...... G06F 9/505; G06F 9/5077; G06F 9/4856; G06F 9/45541
See application file for complete search history.

(56) References Cited

U.S. PATENT DOCUMENTS

| | | | |
|---|---|---|---|
| 8,584,088 B1* | 11/2013 | Carrick | G06F 8/36 717/124 |
| 2017/0249763 A1* | 8/2017 | Garvey | G06F 11/3452 |
| 2017/0295084 A1* | 10/2017 | Ramanath | H04L 43/0876 |
| 2018/0246751 A1* | 8/2018 | Dong | G06F 9/505 |
| 2020/0042338 A1* | 2/2020 | Poothia | G06F 3/067 |

OTHER PUBLICATIONS

"Foundations—2; Periodicity Detection, Time-series Correlation, Burst Detection", http://www.I3s.de/~anand/tir14/lectures/ws14-tir-foundations-2.pdf, retrieved Jun. 24, 2020, 28 pgs.
Bailey, Donald G. "Detecting Regular Patterns Using Frequency Domain Self-filtering", 1997 IEEE, pp. 440-443.

(Continued)

*Primary Examiner* — Sisley N Kim
(74) *Attorney, Agent, or Firm* — Loza & Loza, LLP

(57) ABSTRACT

System and computer-implemented method for managing workloads in a computing environment use collected resource utilization metrics for a workload of a compute instance running in the computing environment that are superimposed to produce a unified time series of the resource utilization metrics for the workload. Undesired periodic patterns are then removed from the unified time series of the resource utilization metrics, which is used to identify the compute instance as a particular type of compute instances. Based on the identification, an action is recommended and implemented on the compute instance.

20 Claims, 12 Drawing Sheets

(56) References Cited

OTHER PUBLICATIONS

Wikipedia, "Harmonic mean", https://en.wikipedia.org/wiki/Harmonic_mean, retrieved Jun. 24, 2020, 13 pgs.
Wikipdia, "k-means clustering", https://en.wikipedia.org/wiki/K-means_clustering, retrieved Jun. 24, 2020, 12 pgs.
Wikipedia, "cron", https://en.wikipedia.org/wiki/Cron, retrieved Jun. 24, 2020, 8 pgs.
Wikipedia, "Standard deviation", https://en.wikipedia.org/wiki/Standard_deviation, retrieved Jun. 24 2020, 25 pgs.
Wikipedia, "Arithmetic mean", https://en.wikipedia.org/wiki/Arithmetic_mean, retrieved Jun. 24, 2020, 7 pgs.

* cited by examiner

SYSTEM AND METHOD FOR MANAGING WORKLOADS USING SUPERIMPOSITION OF RESOURCE UTILIZATION METRICS

RELATED APPLICATIONS

Benefit is claimed under 35 U.S.C. 119(a)-(d) to Foreign Application Serial No. 201941014309 filed in India entitled "SYSTEM AND METHOD FOR MANAGING WORKLOADSUSING SUPERIMPOSITION OF RESOURCE UTILIZATION METRICS", on Apr. 9, 2019, by VMware, Inc., which is herein incorporated in its entirety by reference for all purposes.

BACKGROUND

A hybrid cloud computing environment uses computing resources in both an "off-premise" location (also referred to as a public cloud computing environment) and an "on-premise" location (referred to as on-premise or private cloud computing environment). The off-premise location generally includes computer systems managed or controlled by a provider of "public cloud" computing services and the on-premise location includes computer systems managed or controlled by a single entity that may subscribe to and utilize the public cloud computing services.

The use of public cloud services comes with a convenience of having on-demand services. However, the use of public cloud services may be costlier than hosting and managing their counterpart services on a private cloud computing environment. As an example, it has been observed that many virtual computing instances, such as virtual machines, deployed on a public cloud computing environment are used for development/experimental works, which are often left unmanaged or not deleted by the developers after their use. Thus, these virtual computing instances may remain idle and continue to get charged by the cloud providers indefinitely or for a long period of time until a manual clean-up operation is undertaken. As another example, some virtual computing instances deployed on a public cloud computing environment are often used only for few minutes/hours in a day or week, but still remain live throughout an extended period and incur charges for the entire period. Similarly, many workloads deployed on a public cloud computing environment are scheduled cron jobs that run periodically for a few times a day, week or month, but are still charged for the entire period.

SUMMARY

System and computer-implemented method for managing workloads in a computing environment use collected resource utilization metrics for a workload of a compute instance running in the computing environment that are superimposed to produce a unified time series of the resource utilization metrics for the workload. Undesired periodic patterns are then removed from the unified time series of the resource utilization metrics, which is used to identify the compute instance as a particular type of compute instances. Based on the identification, an action is recommended and implemented on the compute instance.

A computer-implemented method for managing workloads in a computing environment in accordance with an embodiment of the invention comprises collecting a plurality of resource utilization metrics for a workload of a compute instance running in the computing environment, superimposing the resource utilization metrics for the workload to produce an initial unified time series of the resource utilization metrics for the workload, removing undesired periodic patterns from the initial unified time series of the resource utilization metrics for the workload to produce a final unified time series of the resource utilization metrics for the workload, identifying the compute instance as a particular type of compute instances using the final unified time series of the resource utilization metrics for the workload, recommending an action based on the particular type of compute instances that has been identified for the compute instance, and implementing the action on the compute instance running in the computing environment to manage resources in the computing environment. In some embodiments, the steps of this method are performed when program instructions contained in a computer-readable storage medium are executed by at least one processor.

A system in accordance with an embodiment of the invention includes memory and at least one processor configured to collect a plurality of resource utilization metrics for a workload of a compute instance running in a computing environment, superimpose the resource utilization metrics for the workload to produce an initial unified time series of the resource utilization metrics for the workload, remove undesired periodic patterns from the initial unified time series of the resource utilization metrics for the workload to produce a final unified time series of the resource utilization metrics for the workload, identify the compute instance as a particular type of compute instances using the final unified time series of the resource utilization metrics for the workload, recommend an action based on the particular type of compute instances that has been identified for the compute instance, and implement the action on the compute instance running in the computing environment to manage resources in the computing environment.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
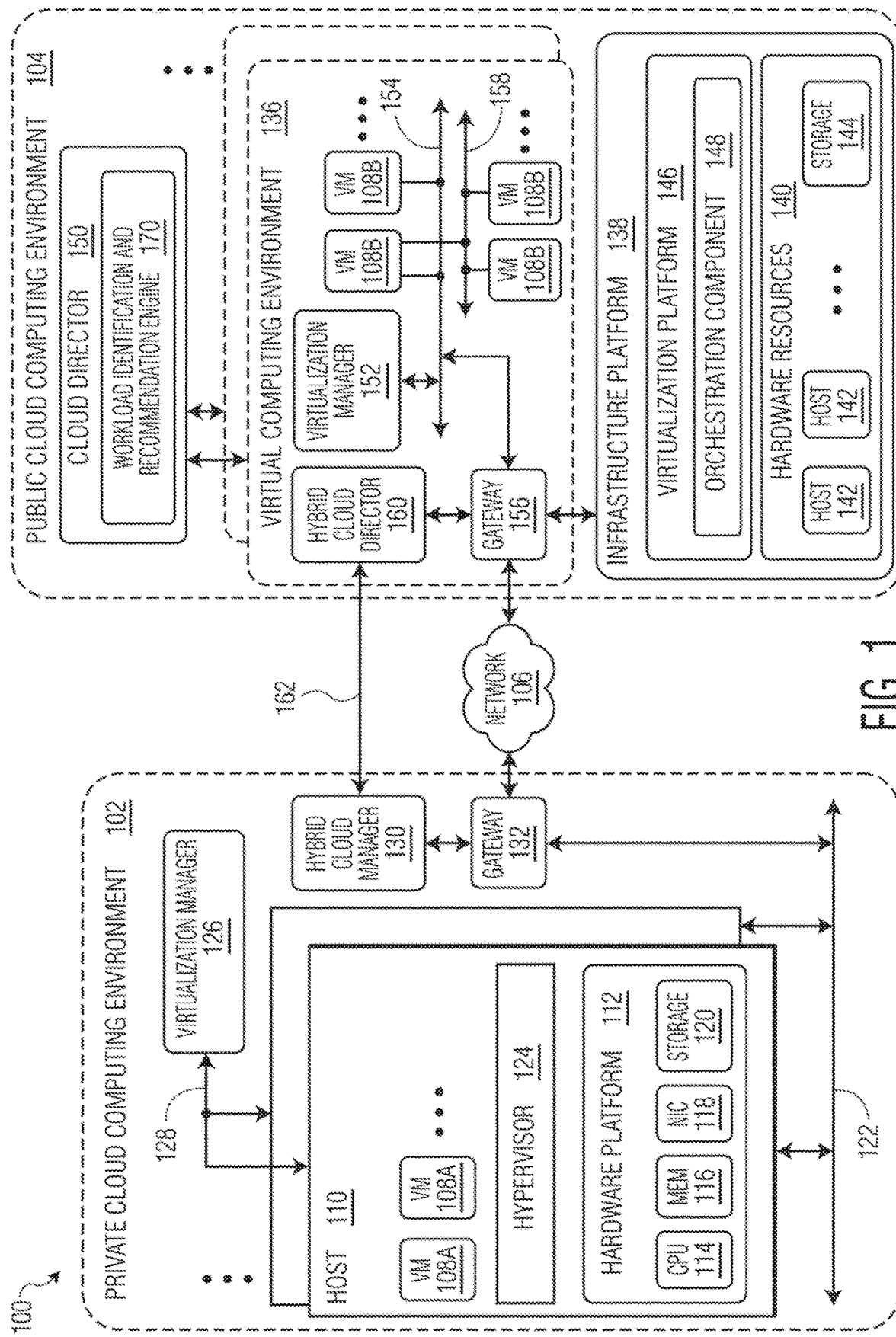
FIG. 1 is a block diagram of a computing system in accordance with an embodiment of the invention.

Turning now to FIG. 1, a block diagram of a computing system 100 in accordance with an embodiment of the invention is shown. The computing system may be a hybrid cloud computing system, which includes at least one private cloud computing environment 102 and at least one public cloud computing environment 104 that are connected to each other via a network 106. The computing system is configured to provide a common platform for managing and executing workloads seamlessly between the private and public cloud computing environments. In one embodiment, the private cloud computing environment may be controlled and administrated by a particular enterprise or business organization, while the public cloud computing environment may be operated by a cloud computing service provider and exposed as a service available to account holders, such as the particular enterprise in addition to other enterprises. In some embodiments, the private cloud computing environment may be a private or on-premise data center. The network 106 can be any type of computer network or a combination of networks that allows communications between devices connected to the network. The network may include the Internet, a wide area network (WAN), a local area network (LAN), a storage area network (SAN), a fibre channel network and/or other networks. The network may be configured to support protocols suited for communications with storage arrays, such as Fibre Channel, Internet Small Computer System Interface (iSCSI), Fibre Channel over Ethernet (FCoE) and HyperSCSI. The license server may be located within the private cloud computing environment or the public cloud computing environment.

The private and public cloud computing environments 102 and 104 of the computing system 100 include computing and/or storage infrastructures to support a number of virtual computing instances 108A and 108B. As used herein, the term "virtual computing instance" refers to any software processing entity that can run on a computer system, such as a software application, a software process, a virtual machine (VM), e.g., a VM supported by virtualization products of VMware, Inc., and a software "container", e.g., a Docker container. However, in this disclosure, the virtual computing instances will be described as being virtual machines, although embodiments of the invention described herein are not limited to virtual machines.

In some embodiments, the computing system 100 supports migration of the virtual machines 108 between the private and public cloud computing environments 102 and 104. The computing system may also support migration of the virtual machines between different sites situated at different physical locations, which may be computing environments in the private and/or public cloud computing environments.

As shown in FIG. 1, the private cloud computing environment 102 of the computing system 100 includes one or more host computer systems ("hosts") 110. The hosts may be constructed on a server grade hardware platform 112, such as an x86 architecture platform. As shown, the hardware platform of each host may include conventional components of a computing device, such as one or more processors (e.g., CPUs) 114, system memory 116, a network interface 118, storage system 120, and other input/output devices such as, for example, a mouse and a keyboard (not shown). The processor is configured to execute instructions, for example, executable instructions that perform one or more operations described herein and may be stored in the system memory and/or the storage system. In some embodiments, the system memory is volatile memory used for retrieving programs and processing data. The system memory may include, for example, one or more random access memory (RAM) modules. The network interface enables the host to communicate with another device via a communication medium, such as a network 122 within the private cloud computing environment. The network interface may be one or more network adapters, also referred to as a Network Interface Card (NIC). The storage system represents local storage devices (e.g., one or more hard disks, flash memory modules, solid state disks and optical disks) and/or a storage interface that enables the host to communicate with one or more network data storage systems. Example of a storage interface is a host bus adapter (HBA) that couples the host to one or more storage arrays, such as a storage area network (SAN) or a network-attached storage (NAS), as well as other network data storage systems. The storage system is used to store information, such as executable instructions, cryptographic keys, virtual disks, configurations and other data, which can be retrieved by the host.

Each host 110 may be configured to provide a virtualization layer that abstracts processor, memory, storage and networking resources of the hardware platform 112 into the virtual computing instances, e.g., the virtual machines 108A, that run concurrently on the same host. The virtual machines run on top of a software interface layer, which is referred to herein as a hypervisor 124, that enables sharing of the hardware resources of the host by the virtual machines. One example of the hypervisor that may be used in an embodiment described herein is a VMware ESXi™ hypervisor provided as part of the VMware vSphere® solution made commercially available from VMware, Inc. The hypervisor may run on top of the operating system of the host or directly on hardware components of the host. For other types of virtual computing instances, the host may include other virtualization software platforms to support those virtual computing instances, such as Docker virtualization platform to support software containers.

The private cloud computing environment 102 includes a virtualization manager 126 that communicates with the hosts 110 via a management network 128. In an embodiment, the virtualization manager is a computer program that resides and executes in a computer system, such as one of the hosts, or in a virtual computing instance, such as one of the virtual machines 108A running on the hosts. One example of the virtualization manager is the VMware vCenter Server® product made available from VMware, Inc. The virtualization manager is configured to carry out administrative tasks for the private cloud computing environment, including managing the hosts, managing the VMs running within each host, provisioning VMs, migrating VMs from one host to another host, and load balancing between the hosts.

In one embodiment, the private cloud computing environment 102 includes a hybrid cloud manager 130 configured to manage and integrate computing resources provided by the private cloud computing environment with computing resources provided by the public cloud computing environment 104 to form a unified "hybrid" computing platform. The hybrid cloud manager is configured to deploy virtual computing instances, e.g., virtual machines 108A, in the private cloud computing environment, transfer VMs from the private cloud computing environment to the public cloud computing environment, and perform other "cross-cloud" administrative tasks. In some embodiments, the hybrid cloud manager is a virtual appliance, which may include a collection of applications or services. In one implementation, the hybrid cloud manager is a module or plug-in to the virtualization manager 126, although other implementations may be used, such as a separate computer program executing in any computer system or running in a virtual machine in one of the hosts. One example of the hybrid cloud manager is the VMware® Hybrid Cloud Extension (HCX) HCX™ product made available from VMware, Inc.

In one embodiment, the hybrid cloud manager 130 is configured to control network traffic into the network 106 via a gateway device 132, which may include a virtual appliance. The gateway device 132 is configured to provide the virtual machines 108A and other devices in the private cloud computing environment 102 with connectivity to external devices via the network 106. The gateway device 132 may manage external public Internet Protocol (IP) addresses for the virtual machines 108A and route traffic incoming to and outgoing from the private cloud computing environment and provide networking services, such as firewalls, network address translation (NAT), dynamic host configuration protocol (DHCP), load balancing, and virtual private network (VPN) connectivity over the network 106.

The public cloud computing environment 104 of the computing system 100 is configured to dynamically provide an enterprise (or users of an enterprise) with one or more virtual computing environments 136 in which an administrator of the enterprise may provision virtual computing instances, e.g., the virtual machines 108B, and install and execute various applications in the virtual computing instances. The public cloud computing environment includes an infrastructure platform 138 upon which the virtual computing environments can be executed. In the particular embodiment of FIG. 1, the infrastructure platform includes hardware resources 140 having computing resources (e.g., hosts 142), storage resources (e.g., one or more storage systems 144), and networking resources (not illustrated), and a virtualization platform 146, which is programmed and/or configured to provide the virtual computing environments 136 that support the virtual machines 108B across the hosts 142. The virtualization platform may be implemented using one or more software programs that reside and execute in one or more computer systems, such as the hosts 142, or in one or more virtual computing instances, such as the virtual machines 108B, running on the hosts.

In one embodiment, the virtualization platform 146 includes an orchestration component 148 that provides infrastructure resources to the virtual computing environments 136 responsive to provisioning requests. The orchestration component may instantiate VMs according to a requested template that defines one or more VMs having specified virtual computing resources (e.g., compute, networking and storage resources). Further, the orchestration component may monitor the infrastructure resource consumption levels and requirements of the virtual computing environments and provide additional infrastructure resources to the virtual computing environments as needed or desired. In one example, similar to the private cloud computing environment 102, the virtualization platform may be implemented by running on the hosts 142 VMware ESXi™-based hypervisor technologies provided by VMware, Inc. However, the virtualization platform may be implemented using any other virtualization technologies, including Xen®, Microsoft Hyper-V® and/or Docker virtualization technologies, depending on the virtual computing instances being used in the public cloud computing environment 104.

In one embodiment, the public cloud computing environment 104 may include a cloud director 150 that manages allocation of virtual computing resources to an enterprise. The cloud director may be accessible to users via a REST (Representational State Transfer) API (Application Programming Interface) or any other client-server communication protocol. The cloud director may authenticate connection attempts from the enterprise using credentials issued by the cloud computing provider. The cloud director receives provisioning requests submitted (e.g., via REST API calls) and may propagate such requests to the orchestration component 148 to instantiate the requested virtual machines (e.g., the virtual machines 108B). One example of the cloud director is the VMware vCloud Director® product from VMware, Inc. The public cloud computing environment may be VMware cloud (VMC) on Amazon Web Services (AWS).

In one embodiment, at least some of the virtual computing environments 136 may be configured as virtual data centers. Each virtual computing environment includes one or more virtual computing instances, such as the virtual machines 108B, and one or more virtualization managers 152. The virtualization managers 152 may be similar to the virtualization manager 126 in the private cloud computing environment 102. One example of the virtualization manager 152 is the VMware vCenter Server® product made available from VMware, Inc. Each virtual computing environment may further include one or more virtual networks 154 used to communicate between the virtual machines 108B running in that environment and managed by at least one gateway device 156, as well as one or more isolated internal networks 158 not connected to the gateway device 156. The gateway device 156, which may include a virtual appliance, is configured to provide the virtual machines 108B and other components in the virtual computing environment with connectivity to external devices, such as components in the private cloud computing environment via the network 106. The gateway device 156 operates in a similar manner as the gateway device 132 in the private cloud computing environment.

In one embodiment, each of the virtual computing environments 136 in the public cloud computing environment 104 includes a hybrid cloud director 160 configured to communicate with the corresponding hybrid cloud manager 130 in the private cloud computing environment 102 to enable a common virtualized computing platform between the private and public cloud computing environments. In some embodiments, the hybrid cloud manager is a virtual appliance, which includes a collection of applications or services. The hybrid cloud director may communicate with the hybrid cloud manager 130 using Internet-based traffic via a VPN tunnel established between the gateways 132 and 156, or alternatively, using a direct connection 162. The hybrid cloud director and the corresponding hybrid cloud manager facilitate cross-cloud migration of virtual computing instances, such as virtual machines 108A and 108B, between the private and public computing environments. This cross-cloud migration may include both "cold migration" in which the virtual machine is powered off during migration, as well as "hot migration" in which the virtual machine is powered on during migration. As an example, the hybrid cloud director may be a component of the HCX-Cloud product and the hybrid cloud manager may be a component of the HCX-Enterprise product, which is provided by VMware, Inc.

In the illustrated embodiment, the cloud director 150 includes a workload identification and recommendation (WIR) engine 170, which operates to manage workloads being performed on compute instances that are running in the public cloud computing environment 104. The compute instances can be any instances that can be instantiated in a computing environment to perform one or more operations or services. As an example, the compute instances may be virtual machines instantiated in some of the hosts 142. As described below, the WIR engine is configured or programmed to manage compute instance workloads by collecting a plurality of resource utilization metrics of the compute instances, superimposing the resource utilization metrics to produce a single unified utilization time series, and using the unified utilization time series to selectively identify the compute instances based on the resource usages of the workloads, which can be selectively turned off or converted to more efficiently utilize resources being consumed for the workloads. The WIR engine may be implemented as one or more software programs running on one or more computer systems, such as the hosts 142.

In other embodiments, the WIR engine 170 may be a standalone engine running in one of the hosts 142 or included in another component in the public cloud computing environment 104 or in the private cloud computing environment 104. If located in the private cloud computing environment, the WIR engine can be configured or programmed to manage workloads being performed on compute instances that are running in the private cloud computing environment.

Figure 2:
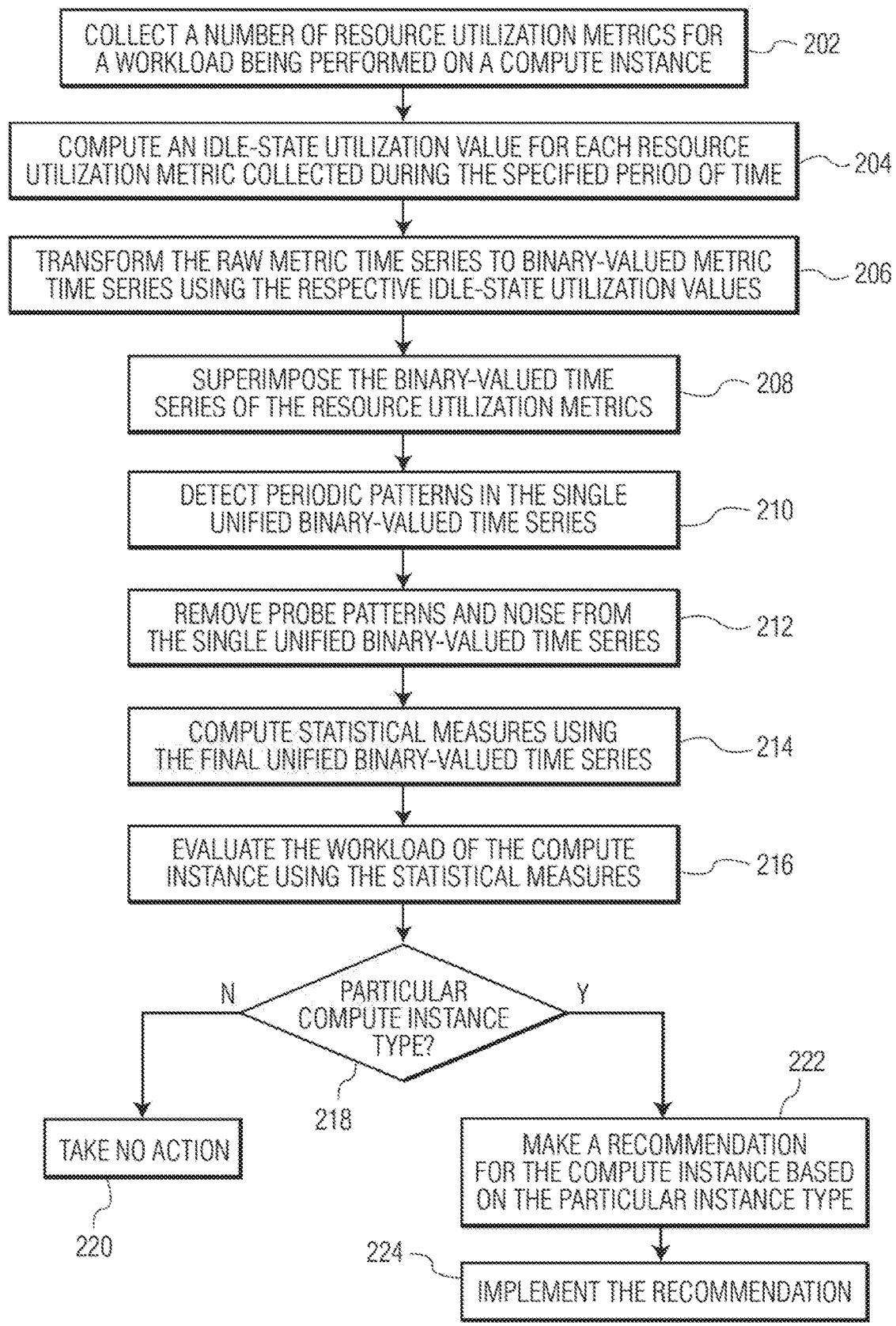
FIG. 2 is a flow diagram of an operation of a workload identification and recommendation (WIR) engine in the computing system in accordance with an embodiment of the invention.

An operation of the WIR engine 170 in accordance with an embodiment of the invention is described with reference to a process flow diagram of FIG. 2. As shown in FIG. 2, the operation starts at block 202, where a number of resource utilization metrics for a workload being performed on a compute instance are collected by the WIR engine for a specified period of time as raw metric time series. In an embodiment, the resource utilization metrics may include metrics for CPU, network and disk usage. These resource utilization metrics may be quantified using known techniques. For example, the CPU metric may be quantified by looking at the percentage of CPU usage, the network metric may be quantified by measuring input/output operations per second (IOPS) and the disk metric may also be quantified by measuring IOPS. In other embodiments, additional or alternative resource utilization metrics may be collected and used for the workload. However, in the following description, the CPU, network and disk metrics will be used to illustrate the operation of the WIR engine.

The specified period of time for the resource utilization metric collection may have a default setting of, for example, five (5) days. However, the specified period of time for the resource utilization metric collection may be set by user input, such as input from an administrator, who may be part of a cloud operation team. Thus, the specified period of time for the resource utilization metric collection can be set to any appropriate period of time, such as few days to few weeks or more.

In an embodiment, the resource utilization metrics may be collected by the WIR engine 170 by retrieving the resource utilization metrics from one or more components in the computing system, such as the hosts 142, the VMs 108B, the virtualization manager 152 and/or the hybrid cloud director 160. These resource utilization metrics may be retrieved using application programming interfaces of the components that monitors or gathers the resource utilization metrics.

Figure 3A:
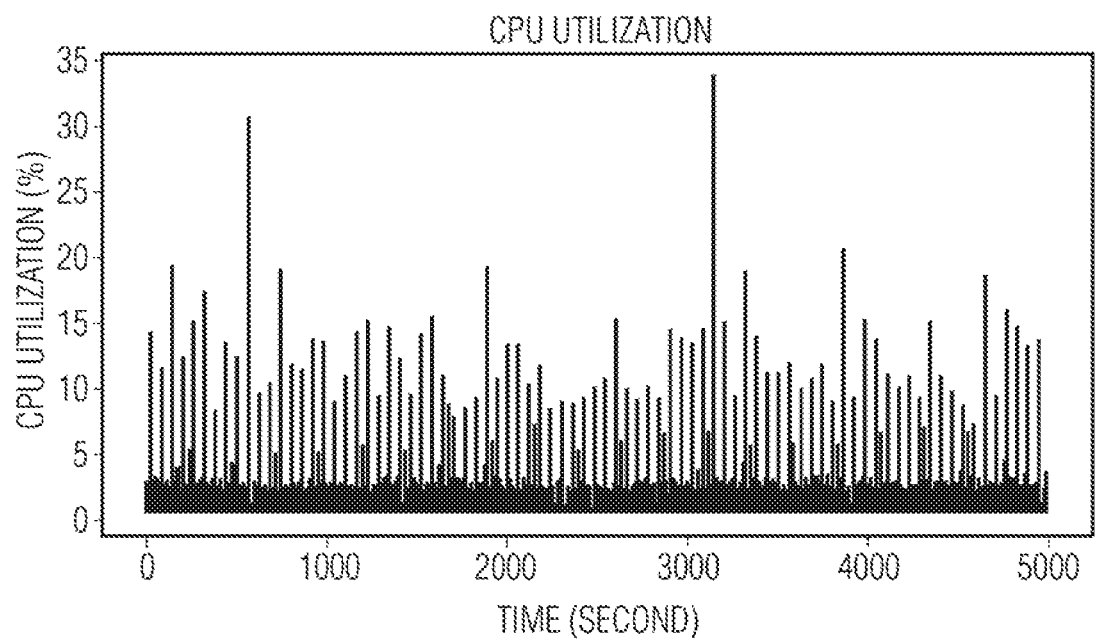
FIGS. 3A-3C illustrate central processing unit (CPU), disk and network utilization time series for a workload of a compute instance in accordance with an embodiment of the invention.
Figure 3B:
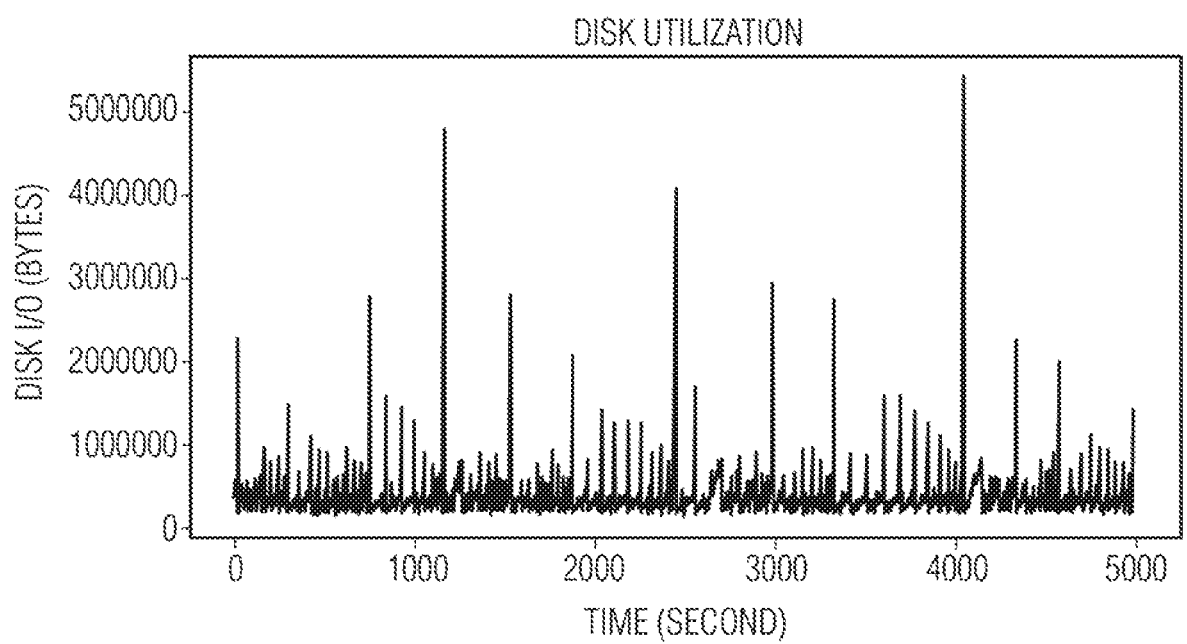
Figure 3C:
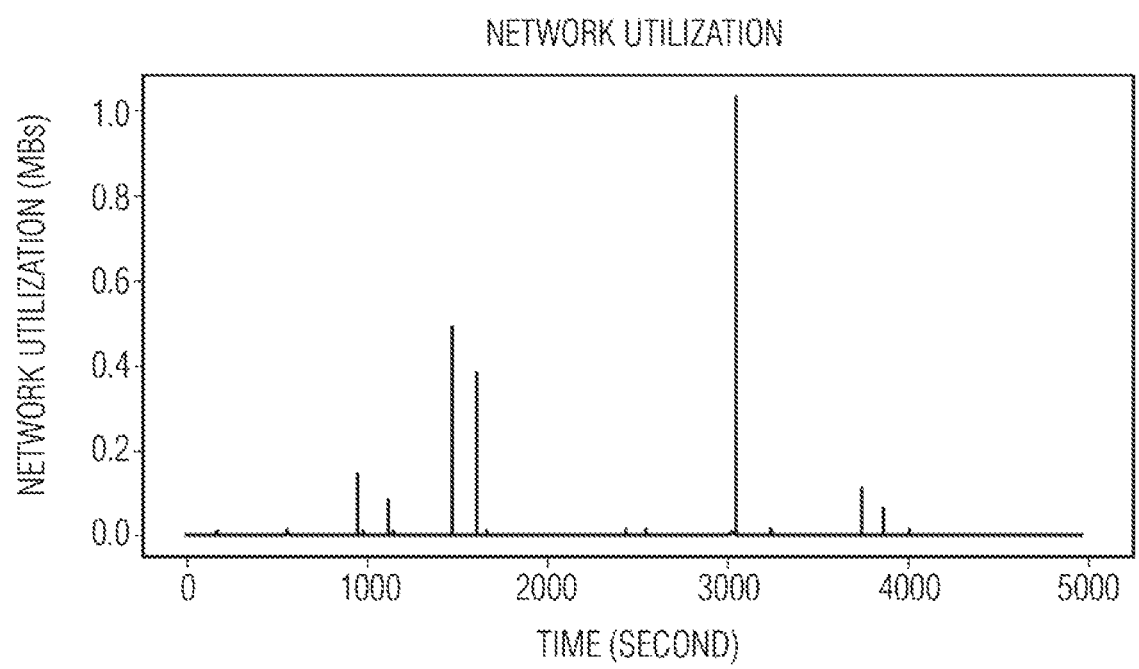

The results of the resource utilization metric collection are illustrated in FIGS. 3A, 3B and 3C. FIG. 3A shows the raw CPU utilization time series for the CPU utilization metric collected during the specified period of time for the workload as CPU percentage versus time in seconds. FIG. 3B shows the raw disk utilization time series for the disk utilization metric collected during the specified period of time for the workload as disk inputs/outputs (I/Os) versus time in seconds. FIG. 3C shows the raw network utilization time series for the network utilization metric collected during the specified period of time for the workload as network utilization in megabytes (MB) versus time in seconds.

Turning back to FIG. 2, at block 204, an idle-state utilization value is computed for each resource utilization metric collected during the specified period of time by the WIR engine 170. As used herein, the idle state is the state of a compute instance when it is not performing any processing except running background operating system processes. Thus, an idle-state utilization value of a resource utilization metric is a utilization value for a particular resource when the compute instance is in the idle state. In the current example, the idle-state utilization values are computed for the CPU, network and disk utilization metrics. These idle-state utilization values for the different metrics can be computed using a statistical approach, such as harmonic mean or K-means clustering approach.

Figure 4A:
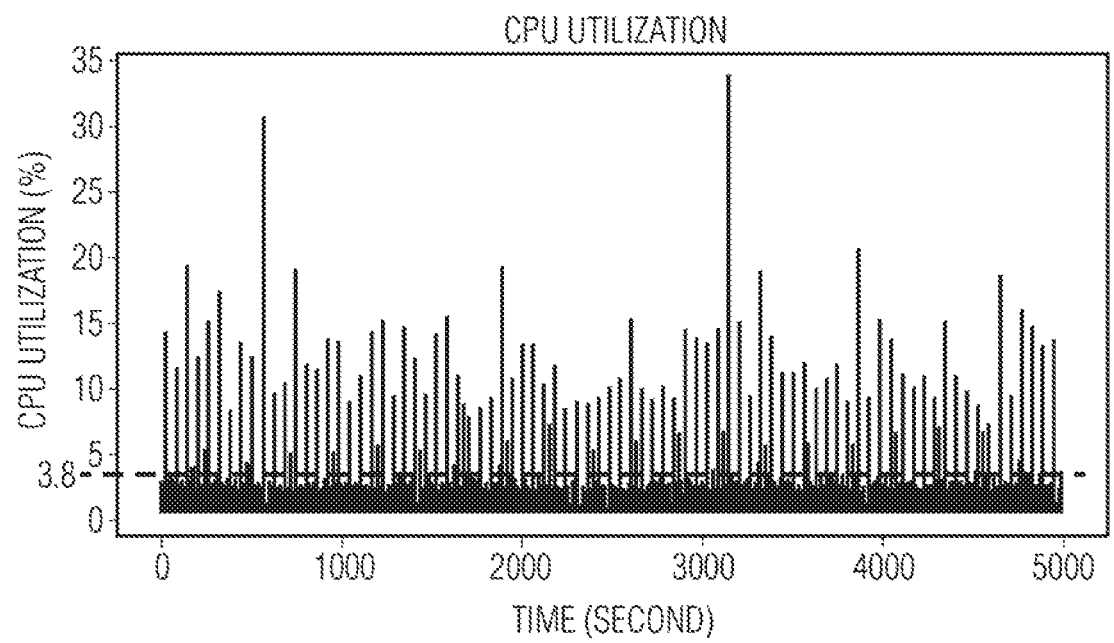
FIGS. 4A-4C illustrate idle state utilization values for the CPU, disk and network utilization time series in accordance with an embodiment of the invention.
Figure 4B:
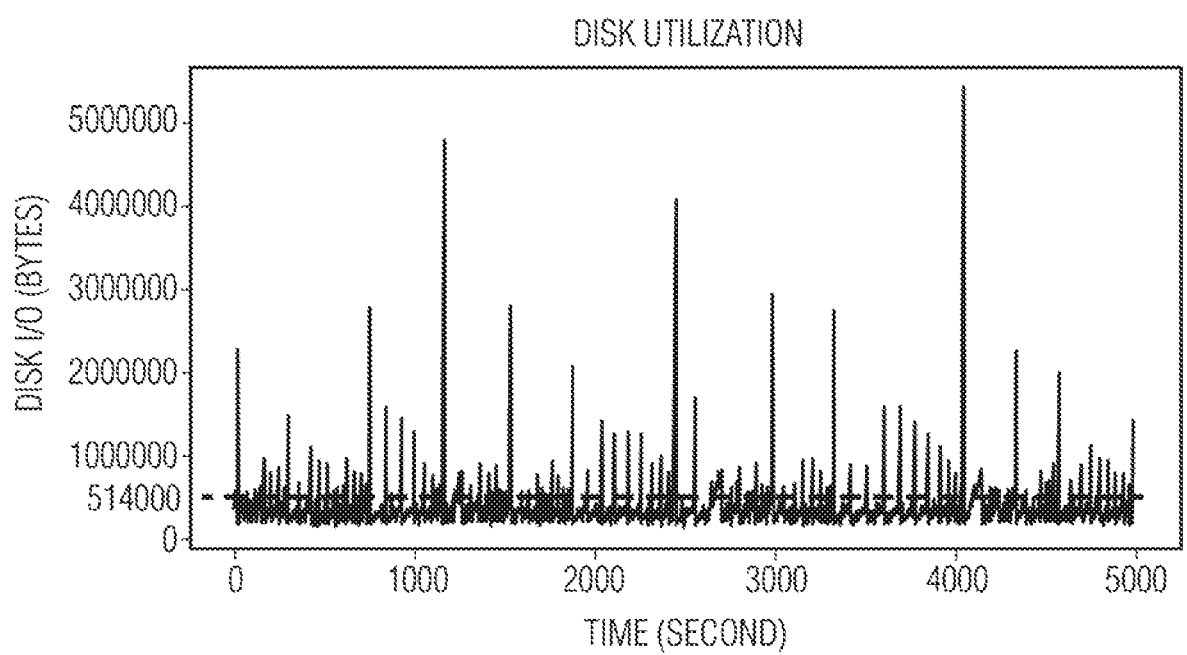
Figure 4C:
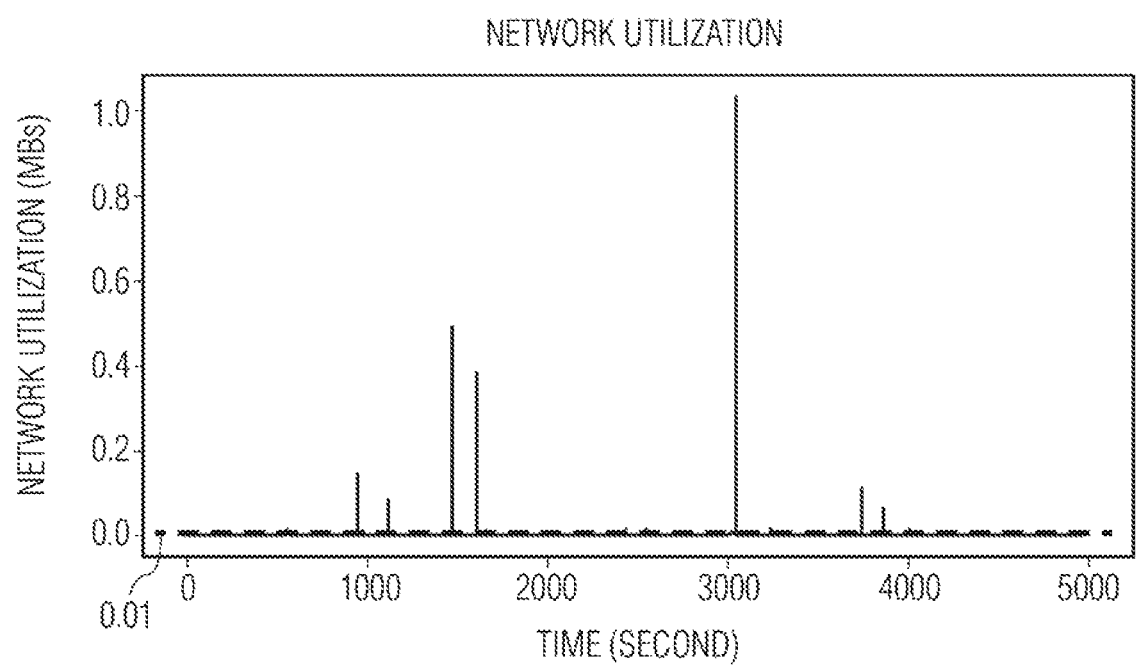

The results of the idle-state utilization value computations for the resource utilization metrics are illustrated in FIGS. 4A, 4B and 4C. FIG. 4A shows the idle-state utilization value of 3.8 percent for the CPU utilization metric. FIG. 4B shows the idle-state utilization value of 514,000 TOPS for the disk utilization metric. FIG. 4C shows the idle-state utilization value of 0.01 MB/s for the network utilization metric.

Turning back to FIG. 2, at block 206, the raw metric time series of the resource utilization metrics are transformed to binary-valued metric time series using the respective idle-state utilization values by the WIR engine 170. This transformation step involves using the idle-state utilization values on the corresponding raw metric time series as thresholds to convert the raw metric time series to the binary time series, where each value in the binary time series is either a zero (0) or a one (1). As a result, the various collected metric values are normalized by modifying them to the same scale (0,1). In an embodiment, each raw utilization metric value can be converted to a zero if that value is below the respective idle-state utilization value or to a one if that value is equal to or greater than the idle-state utilization value. Thus, in this embodiment, each CPU utilization metric value is converted to a zero if the value is below the idle-state CPU utilization value of 3.8 percent or to a one if the value is equal to or greater than the CPU idle-state utilization value of 3.8 percent. In addition, each disk utilization metric value is converted to a zero if the value is below the idle-state disk utilization value of 514,000 TOPS or to a one if the value is equal to or greater than the idle-state disk utilization value of 514,000 TOPS. Furthermore, each network utilization metric value is converted to a zero if the value is below the idle-state network utilization value of 0.01 MB/s or to a one if the value is equal to or greater than the idle-state network utilization value of 0.01 MB/s.

Figure 5A:
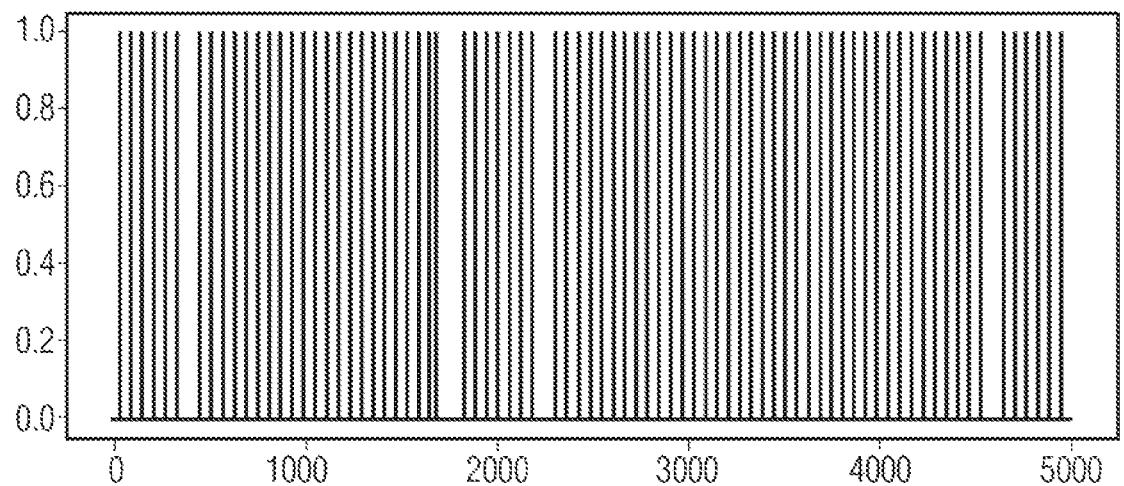
FIGS. 5A-5C illustrate binary-valued time series for the CPU, disk and network utilization time series in accordance with an embodiment of the invention.
Figure 5B:
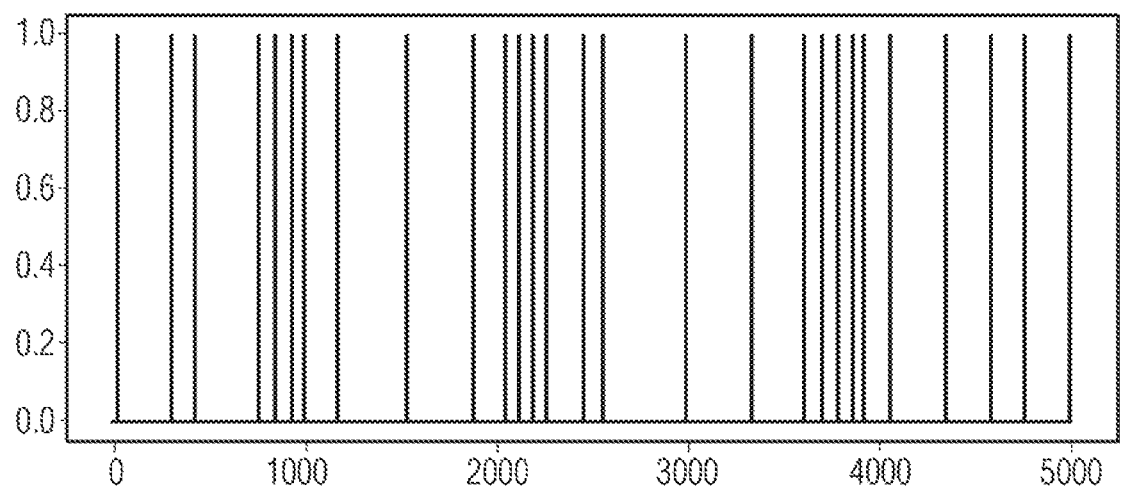
Figure 5C:
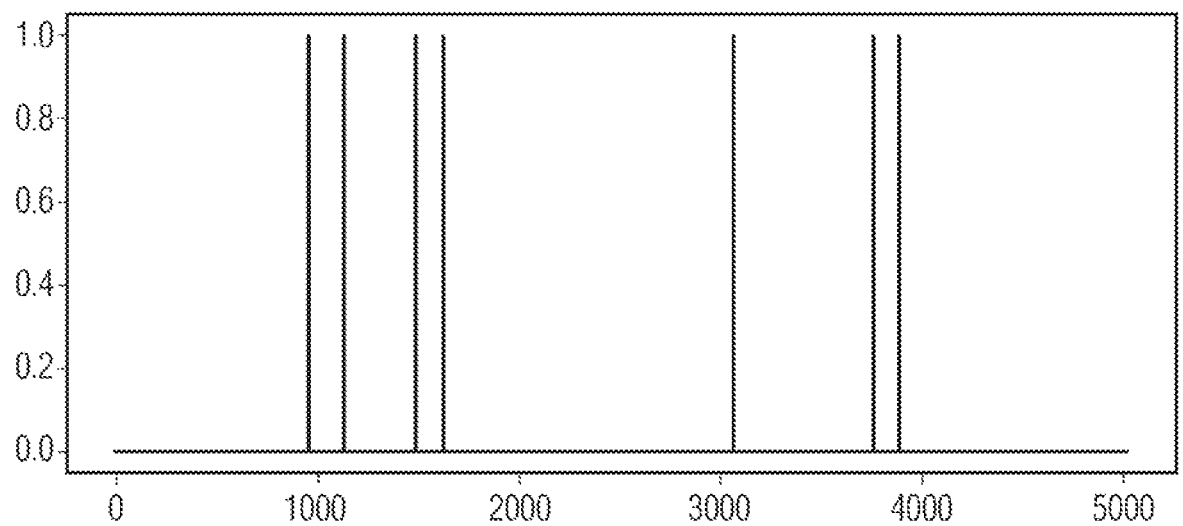

The results of the transformation for the raw metric time series of the resource utilization metrics are illustrated in FIGS. 5A, 5B and 5C. FIG. 5A shows the binary-valued time series for the CPU utilization metric. FIG. 5B shows the binary-valued time series for the disk utilization metric. FIG. 5C shows the binary-valued time series for the network utilization metric.

Turning back to FIG. 2, at block 208, all the binary-valued time series of the resource utilization metrics are superimposed by the WIR engine 170 to produce a single unified binary-valued time series for the workload. Thus, the different binary-valued time series are combined together and aligned with respect to the time to produce the single binary-valued time series. The resulting unified binary-valued time series contains utilization information regarding all the resource utilization metrics, and thus, represents all the resource utilization metrics in a unified way.

Figure 6:
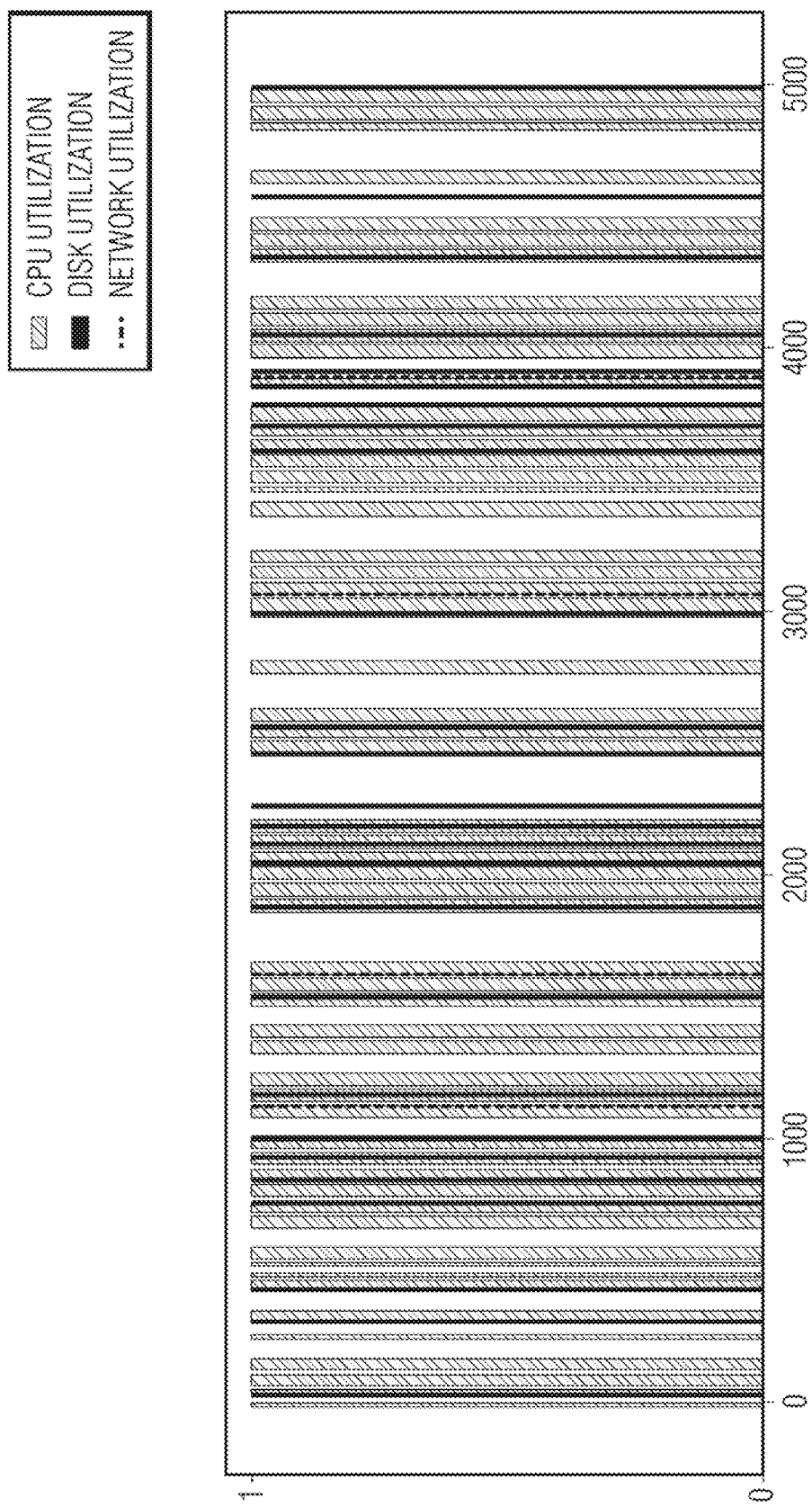
FIG. 6 illustrates a single unified binary-valued time series of the CPU, disk and network binary-valued time series in accordance with an embodiment of the invention.

The result of the superimposition of the binary-valued time series of the different resource utilization metrics is illustrated in FIG. 6, which illustrates the single unified binary-valued time series. As shown in FIG. 6, the different data from the binary-valued time series of the different resource utilization metrics are now found in the unified binary-valued time series. The different data in the unified binary-valued time series form usage bands (i.e., intervals with value of one) and unused bands (i.e., intervals with value of zero).

Turning back to FIG. 2, at block 210, periodic patterns in the single unified binary-valued time series are detected by the WIR engine 170. In an embodiment, Fourier transformation is used to detect the period patterns in the unified binary-valued time series. The periodic patterns indicate repetitive, periodic processes running on the virtual computing instance on which the workload is being performed. As an example, these processes can be background liveliness probes or cron jobs running on the virtual computing instance. Thus, the periodic patterns in the unified binary-valued time series may be undesired periodic patterns that are attributable to the background liveliness probes.

Figure 7:
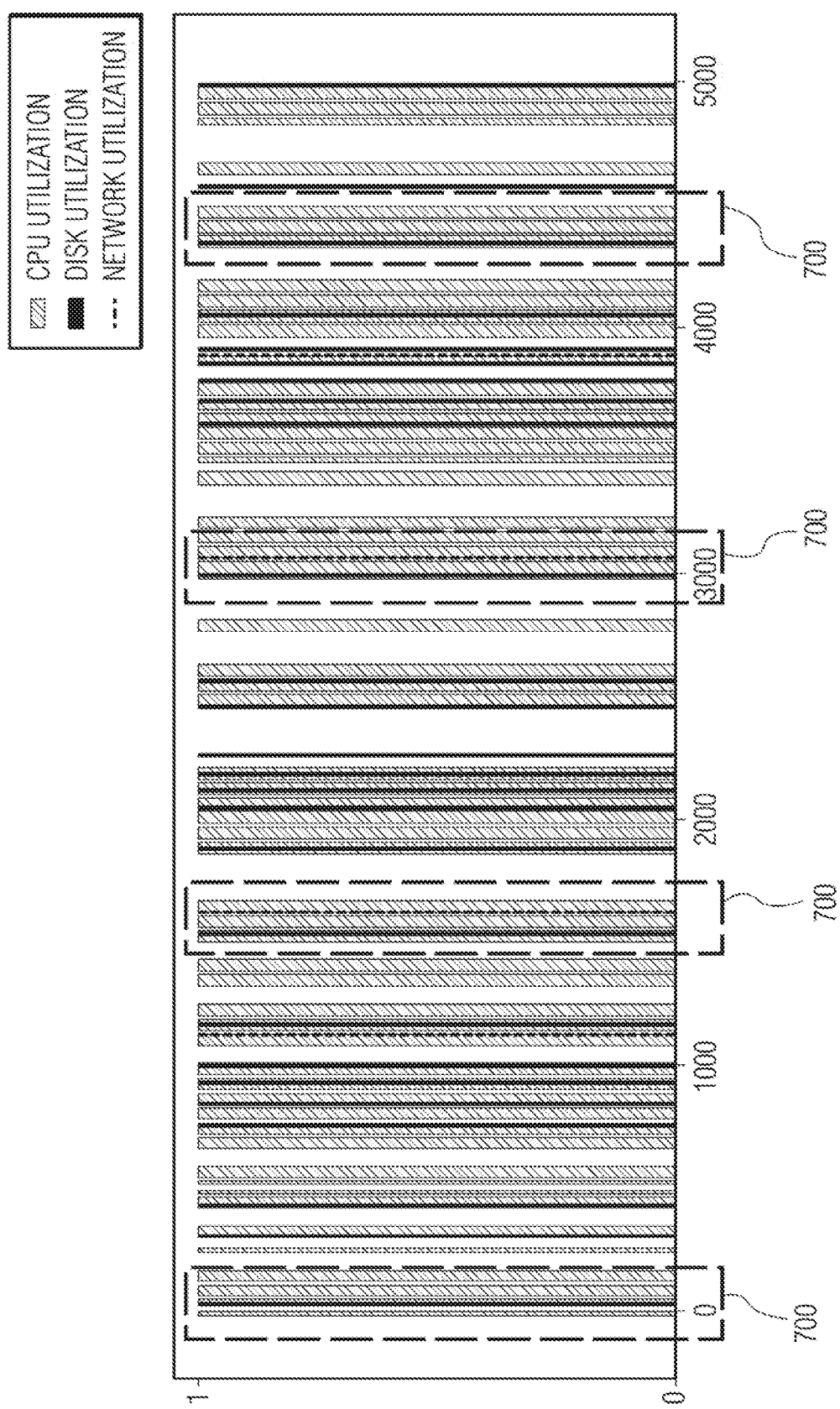
FIG. 7 illustrates periodic patterns detected in the single unified binary-valued time series in accordance with an embodiment of the invention.

The result of the periodic pattern detection in the single unified binary-valued time series is illustrated in FIG. 7, which shows a number of periodic patterns 700. These periodic patterns are produced by processes other than processes to execute the workload. As noted above, these periodic patterns 700 may be caused by liveliness probes or cron jobs.

Turning back to FIG. 2, at block 212, probe patterns and noise are removed from the single unified binary-valued time series by the WIR engine 170. The probe patterns are removed from the single unified binary-valued time series by examining the detected periodic patterns. Since probe durations are generally much shorter than mean usage-band duration, the probe patterns are removed from the unified binary-valued time series using this information. In an embodiment, all periodic patterns that have width or usage duration less than or equal to the mean of all usage bands minus the second standard deviation of periodic pattern's usage bands are considered as probe patterns and filtered out from the unified binary-valued time series. Similarly, noise is removed from the single unified binary-valued time series by looking at widths of isolated usage bands. In an embodiment, isolated usage bands that have width or duration less than or equal to the mean of all usage bands minus the third standard deviation of usage-band duration are considered to be attributable to noise and filtered out from the unified binary-valued time series.

Figure 8:
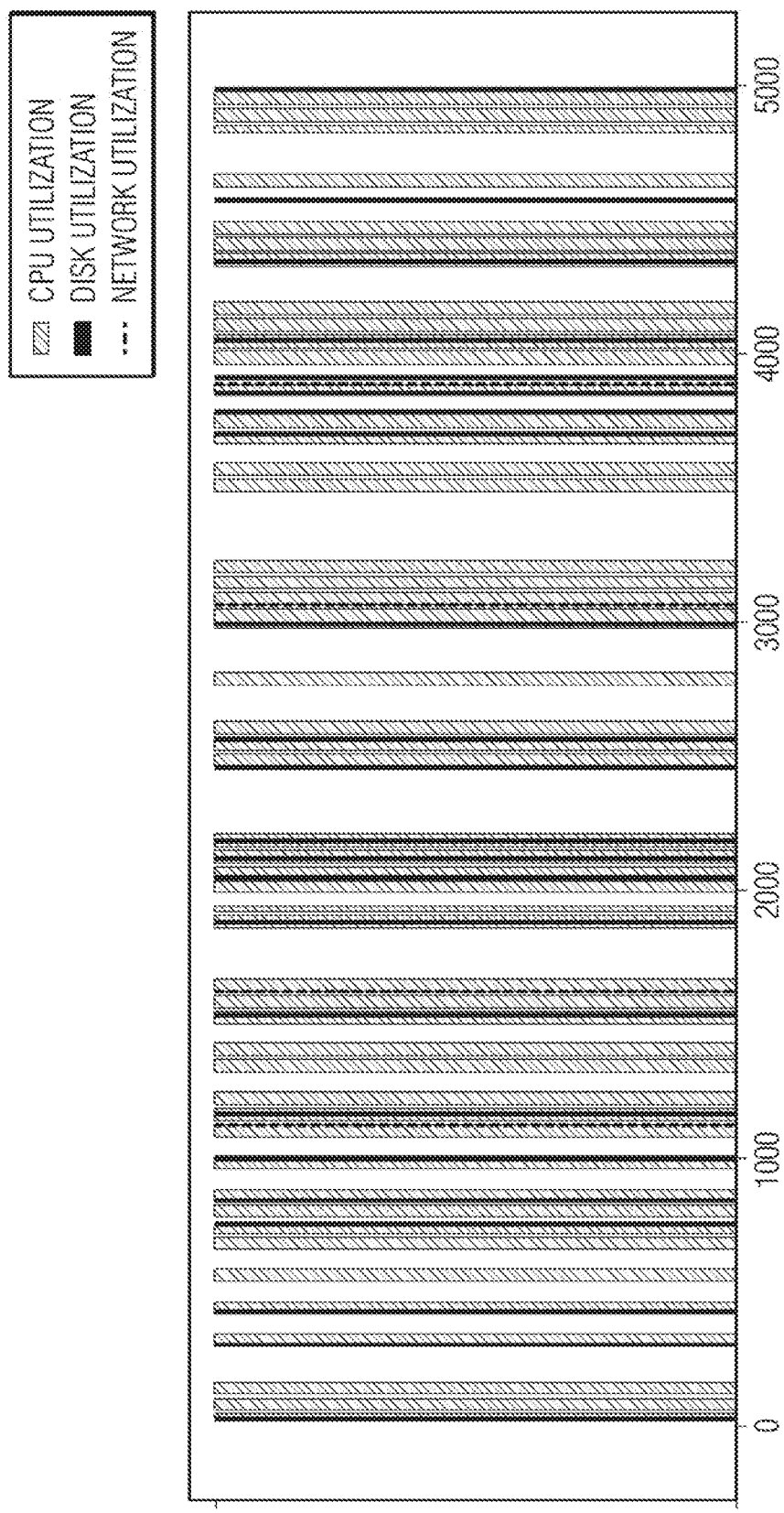
FIG. 8 illustrates a final unified binary-valued time series with probe patterns and noise removed in accordance with an embodiment of the invention.

The result of the probe patterns and noise removal from the single unified binary-valued time series is illustrated in FIG. 8, which is the final unified binary-valued time series. The superimposed time series shown in FIG. 8 shows the usage and non-usage bands. Each non-usage band represents the time duration when the compute instance does not utilize any resources for the workload. Since probe patterns and noise have been removed, the final unified binary-valued time series provides a more accurate resource utilization information of the workload that can be used to identify or classify the workload.

Turning back to FIG. 2, at block 214, statistical measures are computed using the final unified binary-valued time series by the WIR engine 170. These statistical measures are measures that can be used to identify or classify the workload, such as, but not limited to, the mean width of the usage band intervals, the total percentage of resource usage time, the mean width of the unused intervals, the standard deviations of the usage band intervals, the standard deviation of the unused band intervals, the ratio of total unused duration (i.e., the combined width of all the unused bands) to usage duration (i.e., the combined width of all the usuage bands), and the number and schedule of repetitive cron patterns (e.g., the periodic patterns that were not identified as probe patterns).

Next, at block 216, the workload of the compute instance is evaluated by the WIR engine 170 using the statistical measures to determine whether the compute instance is one of particular types of compute instances. In one embodiment, the particular types of compute instances that can be determined using the statistical measures from the final unified binary-valued time series include, but not limited to, an idle instance, a sporadically used instance and a cron instance. An idle instance is an instance that appears to be in an idle state, i.e., minimal amount of work is being performed A sporadically used instance is an instance that appears to randomly or sporadically performs work for a short duration. A cron instance is an instance that appears to perform work for a short duration on a periodic schedule. The different evaluation criteria for workload identification are shown in the table below.

| Evaluation Criteria for Workload Identification | Compute Instance Type |
|---|---|
| Total % Usage Time <= 1% and Number of Repetitive Patterns = 0 | Idle Instance |
| Total % Usage Time <= 20% and Number of Repetitive Patterns = 0 and Standard Deviation of Unused-Band Duration >= 0.8 | Sporadically Used Instance |
| Standard Deviation of Unused-Band Duration <= 0.1 and Number of Repetitive Patterns >= 1 | Cron Instance |

Next, at block 218, a determination is made by the WIR engine 170 whether the compute instance is identified as one of the particular types of compute instance. If not, no action is taken by the WIR engine, at block 220. The operation then comes to an end. However, if the compute instance is identified as one of the particular types of compute instance, then the operation proceeds to block 222.

At block 222, a recommendation for the compute instance is made by the WIR engine 170 depending on the identified compute instance type for the current compute type. In some implementations, the recommendation may be presented to the user on a display device (not shown) operably connected to the WIR engine. In an embodiment, if the compute instance is identified as an idle instance, a recommendation is made to turn off the compute instance. If the compute instance is identified as a sporadically used instance, a recommendation is made to convert the compute instance to a spot instance, which is a compute instance that can be instantiated on-demand. As a spot instance, the compute instance can be instantiated at different times as needed. If the compute instance is identified as a cron instance, a recommendation is made to convert the compute instance to lambda function, which is a compute service that allows running an application or a piece of ode without having to provision or manage servers. Such a service can be scheduled to run at periodic intervals. The recommendations for different compute instance types are shown in the table below.

| Compute Instance Type | Recommendation |
|---|---|
| Idle Instance | Power Off |
| Sporadically Used Instance | Convert to Spot Instance |
| Cron Instance | Convert to Lambda Function |

Next, at block 224, the recommendation is implemented in response to an automatic command from the WIR engine or a manual user input. Thus, in some embodiments, a command may be sent to the virtualization manager 152 to effectuate the recommendation, i.e., to power off the compute instance, to convert the compute instance to a spot instance or to convert the compute instance to a lambda function.

By powering off the compute instance or converting the compute instance to a more efficient instance or function, the resources of the public cloud computing environment 104 can be more efficiently utilized. In addition, if the compute instance is being charged to a customer based on its activated or running state, the customer can save cost by powering off the compute instance or converting the compute instance to an instance or function that are activated as needed to reduce the overall time that the instance or function is in the activated or running state.

Figure 9:
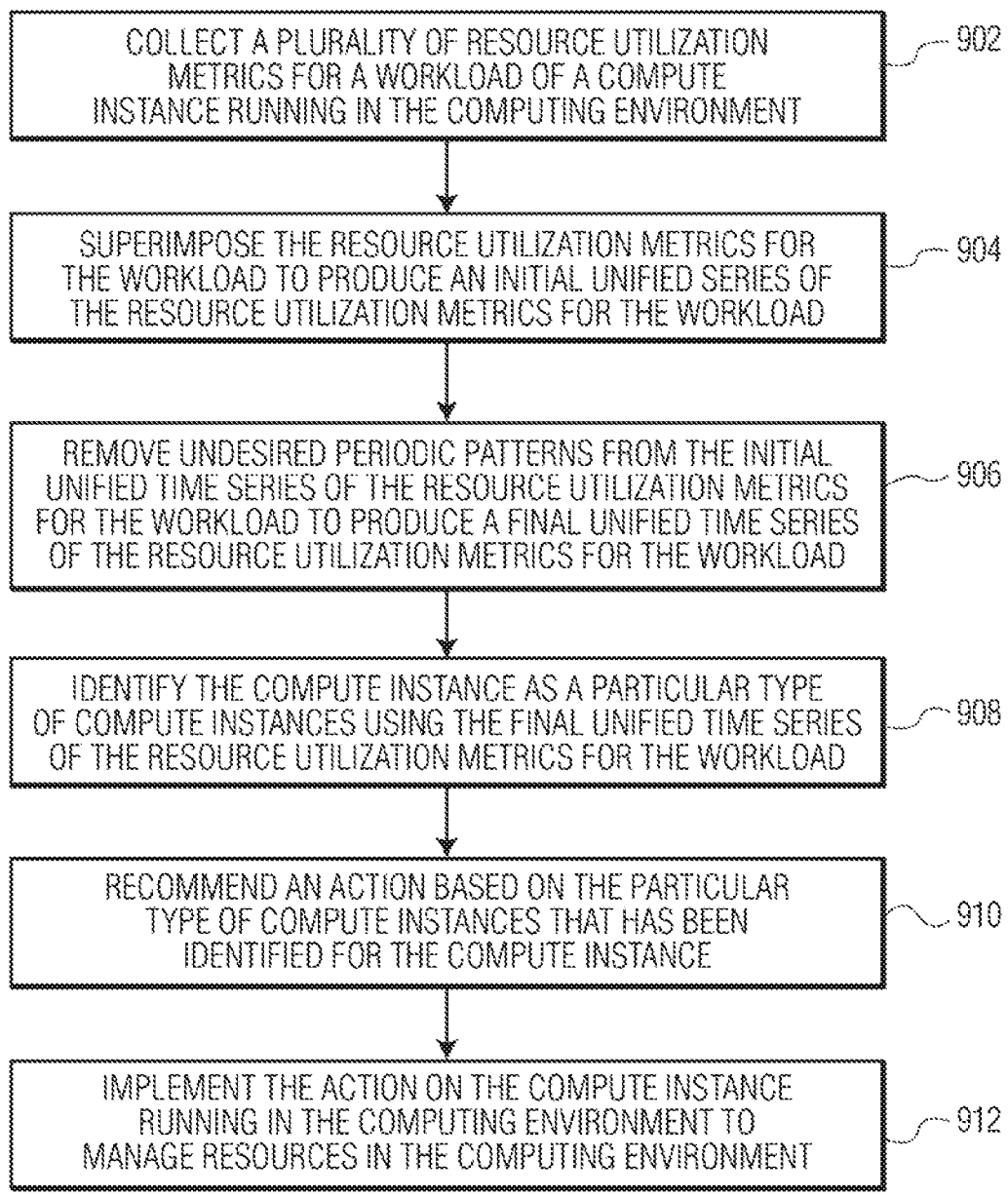
FIG. 9 is a process flow diagram of a computer-implemented method for managing workloads in a computing environment in accordance with an embodiment of the invention.

A computer-implemented method for managing workloads in a computing environment in accordance with an embodiment of the invention is described with reference to a process flow diagram of FIG. 9. At block 902, a plurality of resource utilization metrics for a workload of a compute instance running in the computing environment is collected. As an example, the plurality of resource utilization metrics for the workload may include CPU, network and disk utilization metrics that are collected by the WIR engine 170. At block 904, the resource utilization metrics for the workload are superimposed to produce an initial unified time series of the resource utilization metrics for the workload. At block 906, undesired patterns are removed from the initial unified time series of the resource utilization metrics for the workload to produce a final unified time series of the resource utilization metrics for the workload. At block 908, the compute instance is identified as a particular type of compute instance based on the final unified time series of the resource utilization metrics for the workload. At block 910, an action is recommended based on the particular type of compute instance that has been identified for the compute instance. At block 912, the action is implemented on the compute instance running in the computing environment to more efficiently use resource in the computing environment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for managing workloads in a computing environment, the method comprising:
    collecting a plurality of resource utilization metrics for a workload of a compute instance running in the computing environment;
    superimposing the resource utilization metrics for the workload to produce an initial unified time series of the resource utilization metrics for the workload;
    removing undesired periodic patterns from the initial unified time series of the resource utilization metrics for the workload to produce a final unified time series of the resource utilization metrics for the workload, including removing periodic patterns that are attributable to a background probe running on the compute instance from the initial unified time series of the resource utilization metrics for the workload;
    identifying the compute instance as a particular type of compute instances using the final unified time series of the resource utilization metrics for the workload;
    recommending an action based on the particular type of compute instances that has been identified for the compute instance; and
    implementing the action on the compute instance running in the computing environment to manage resources in the computing environment.

2. The computer-implemented method of claim 1, further comprising removing bands in the initial unified time series of the resource utilization metrics for the workload that are attributable to noise to produce the final unified time series of the resource utilization metrics for the workload.

3. The computer-implemented method of claim 1, further comprising computing an idle-state utilization value for each of the resource utilization metrics.

4. The computer-implemented method of claim 3, further comprising converting each collected resource utilization metric to a binary-valued time series using the idle-state utilization value for that resource utilization metric as a threshold.

5. The computer-implemented method of claim 4, wherein superimposing the resource utilization metrics includes superimposing the binary-valued time series for the resource utilization metrics for the workload to produce the initial unified series of the resource utilization metrics.

6. The computer-implemented method of claim 1, further comprising computing statistical measures from the final unified time series of the resource utilization metrics for the workload, wherein the statistical measures are used to identify the compute instance as one of a plurality of types of compute instances.

7. The computer-implemented method of claim 1, wherein the action that is recommended includes turning off the compute instance when the compute instance is identified as an idle instance, converting the compute instance to a spot instance when the compute instance is identified as a sporadically used instance, or converting the compute instance to a lambda function when the compute instance is identified as a cron instance.

8. A non-transitory computer-readable storage medium containing program instructions for managing workloads in a computing environment, wherein execution of the program instructions by one or more processors causes the one or more processors to perform steps comprising:
    collecting a plurality of resource utilization metrics for a workload of a compute instance running in the computing environment;
    superimposing the resource utilization metrics for the workload to produce an initial unified time series of the resource utilization metrics for the workload;
    removing undesired periodic patterns from the initial unified time series of the resource utilization metrics for the workload to produce a final unified time series of the resource utilization metrics for the workload, including removing periodic patterns that are attributable to a background probe running on the compute instance from the initial unified time series of the resource utilization metrics for the workload;
    identifying the compute instance as a particular type of compute instances using the final unified time series of the resource utilization metrics for the workload;
    recommending an action based on the particular type of compute instances that has been identified for the compute instance; and
    implementing the action on the compute instance running in the computing environment to manage resources in the computing environment.

9. The non-transitory computer-readable storage medium of claim 8, wherein the steps further comprise removing bands in the initial unified time series of the resource utilization metrics for the workload that are attributable to noise to produce the final unified time series of the resource utilization metrics for the workload.

10. The non-transitory computer-readable storage medium of claim 8, wherein the steps further comprise computing an idle-state utilization value for each of the resource utilization metrics.

11. The non-transitory computer-readable storage medium of claim 10, wherein the steps further comprise converting each collected resource utilization metric to a binary-valued time series using the idle-state utilization value for that resource utilization metric as a threshold.

12. The non-transitory computer-readable storage medium of claim 11, wherein superimposing the resource utilization metrics includes superimposing the binary-valued time series for the resource utilization metrics for the workload to produce the initial unified series of the resource utilization metrics.

13. The non-transitory computer-readable storage medium of claim 8, wherein the steps further comprise computing statistical measures from the final unified time series of the resource utilization metrics for the workload, wherein the statistical measures are used to identify the compute instance as one of a plurality of types of compute instances.

14. The non-transitory computer-readable storage medium of claim 8, wherein the action that is recommended includes turning off the compute instance when the compute instance is identified as an idle instance, converting the compute instance to a spot instance when the compute instance is identified as a sporadically used instance, or converting the compute instance to a lambda function when the compute instance is identified as a cron instance.

15. A system comprising:
memory; and
at least one processor configured to:
  collect a plurality of resource utilization metrics for a workload of a compute instance running in a computing environment;
  superimpose the resource utilization metrics for the workload to produce an initial unified time series of the resource utilization metrics for the workload;
  remove undesired periodic patterns from the initial unified time series of the resource utilization metrics for the workload to produce a final unified time series of the resource utilization metrics for the workload;
  identify the compute instance as a particular type of compute instances using the final unified time series of the resource utilization metrics for the workload;
  recommend an action based on the particular type of compute instances that has been identified for the compute instance; and
  implement the action on the compute instance running in the computing environment to manage resources in the computing environment,
  wherein the at least one processor is configured to remove periodic patterns that are attributable to a background probe running on the compute instance from the initial unified time series of the resource utilization metrics for the workload.

16. The system of claim 15, wherein the at least one processor is configured to compute an idle-state utilization value for each of the resource utilization metrics and to convert each collected resource utilization metric to a binary-valued time series using the idle-state utilization value for that resource utilization metric as a threshold.

17. The system of claim 15, wherein the action that is recommended includes turning off the compute instance when the compute instance is identified as an idle instance, converting the compute instance to a spot instance when the compute instance is identified as a sporadically used instance, or converting the compute instance to a lambda function when the compute instance is identified as a cron instance.

18. A computer-implemented method for managing workloads in a computing environment, the method comprising:
  collecting a plurality of resource utilization metrics for a workload of a compute instance running in the computing environment;
  superimposing the resource utilization metrics for the workload to produce an initial unified time series of the resource utilization metrics for the workload;
  removing undesired periodic patterns from the initial unified time series of the resource utilization metrics for the workload to produce a final unified time series of the resource utilization metrics for the workload;
  identifying the compute instance as a particular type of compute instances using the final unified time series of the resource utilization metrics for the workload;
  recommending an action based on the particular type of compute instances that has been identified for the compute instance; and
  implementing the action on the compute instance running in the computing environment to manage resources in the computing environment,
  wherein the action that is recommended includes turning off the compute instance when the compute instance is identified as an idle instance, converting the compute instance to a spot instance when the compute instance is identified as a sporadically used instance, or converting the compute instance to a lambda function when the compute instance is identified as a cron instance.

19. A non-transitory computer-readable storage medium containing program instructions for managing workloads in a computing environment, wherein execution of the program instructions by one or more processors causes the one or more processors to perform steps comprising:
  collecting a plurality of resource utilization metrics for a workload of a compute instance running in the computing environment;
  superimposing the resource utilization metrics for the workload to produce an initial unified time series of the resource utilization metrics for the workload;
  removing undesired periodic patterns from the initial unified time series of the resource utilization metrics for the workload to produce a final unified time series of the resource utilization metrics for the workload;
  identifying the compute instance as a particular type of compute instances using the final unified time series of the resource utilization metrics for the workload;
  recommending an action based on the particular type of compute instances that has been identified for the compute instance; and
  implementing the action on the compute instance running in the computing environment to manage resources in the computing environment,
  wherein the action that is recommended includes turning off the compute instance when the compute instance is identified as an idle instance, converting the compute instance to a spot instance when the compute instance is identified as a sporadically used instance, or converting the compute instance to a lambda function when the compute instance is identified as a cron instance.

20. A system comprising:
memory; and
at least one processor configured to:
  collect a plurality of resource utilization metrics for a workload of a compute instance running in a computing environment;
  superimpose the resource utilization metrics for the workload to produce an initial unified time series of the resource utilization metrics for the workload;
  remove undesired periodic patterns from the initial unified time series of the resource utilization metrics for the workload to produce a final unified time series of the resource utilization metrics for the workload;

identify the compute instance as a particular type of compute instances using the final unified time series of the resource utilization metrics for the workload;
recommend an action based on the particular type of compute instances that has been identified for the compute instance; and
implement the action on the compute instance running in the computing environment to manage resources in the computing environment,
wherein the action that is recommended includes turning off the compute instance when the compute instance is identified as an idle instance, converting the compute instance to a spot instance when the compute instance is identified as a sporadically used instance, or converting the compute instance to a lambda function when the compute instance is identified as a cron instance.

* * * * *